US010264409B1

(12) United States Patent
Xu et al.

(10) Patent No.: US 10,264,409 B1
(45) Date of Patent: Apr. 16, 2019

(54) VIRTUAL DYNAMIC POOL OF SIM-BASED DEVICES

(71) Applicant: Syniverse Technologies, LLC, Tampa, FL (US)

(72) Inventors: Huiyue Xu, Beijing (CN); Vladislav Papayan, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/058,590

(22) Filed: Aug. 8, 2018

Related U.S. Application Data

(60) Provisional application No. 62/542,478, filed on Aug. 8, 2017.

(51) Int. Cl.
| | | |
|---|---|---|
| H04L 12/28 | (2006.01) | |
| H04W 4/06 | (2009.01) | |
| H04W 8/18 | (2009.01) | |
| H04W 92/18 | (2009.01) | |
| H04W 76/12 | (2018.01) | |
| H04L 29/06 | (2006.01) | |
| H04W 88/04 | (2009.01) | |
| H04W 4/70 | (2018.01) | |
| H04L 29/12 | (2006.01) | |
| H04J 1/16 | (2006.01) | |

(52) U.S. Cl.
CPC ........... *H04W 4/06* (2013.01); *H04L 61/2007* (2013.01); *H04L 63/0876* (2013.01); *H04W 4/70* (2018.02); *H04W 8/18* (2013.01); *H04W 76/12* (2018.02); *H04W 88/04* (2013.01); *H04W 92/18* (2013.01); *H04L 2212/00* (2013.01)

(58) Field of Classification Search
USPC .................. 370/252, 329, 389, 386, 401
See application file for complete search history.

(56) References Cited

U.S. PATENT DOCUMENTS

2006/0075123 A1* 4/2006 Burr .................. H04L 29/12311
709/228
2015/0281171 A1* 10/2015 Xiao ...................... H04L 47/70
709/225

* cited by examiner

*Primary Examiner* — John Pezzlo
(74) *Attorney, Agent, or Firm* — Nicholas Pfeifer; Smith & Hopen, P.A.

(57) ABSTRACT

A method of transmitting data to a virtual group consisting of multiple user devices. A plurality of network-connected user devices are grouped together into a virtual group using their International Mobile Subscriber Identification (IMSI) or Mobile Station International Subscriber Directory Number (MSISDN) contained within a SIM card residing within each user device. An application programming interface (API) and a single identification are established for the virtual group and are exposed to an application server. Data packets sent to the virtual group via a communications protocol from the application server are intercepted and directed to each user device within the virtual group. The plurality of user devices within the virtual group can simultaneously receive the data stream.

20 Claims, 8 Drawing Sheets

VIRTUAL DYNAMIC POOL OF SIM-BASED DEVICES

CROSS-REFERENCE TO RELATED APPLICATIONS

This nonprovisional application is a continuation of and claims priority to provisional application No. 62/542,478, entitled "VIRTUAL DYNAMIC POOL OF SIM-BASED DEVICES," filed Aug. 8, 2017 by the same inventor(s).

BACKGROUND OF THE INVENTION

1. Field of the Invention

This invention relates to the field of telecommunications. More specifically, it relates to a method and system of identifying multiple communication devices from different mobile data networks, combining them into virtual groups and mediating the communications among the devices and cloud servers. The communications include peer-to-peer, broadcasting, replicating, streaming, etc., with security control and authentication procedures via system APIs.

2. Brief Description of the Related Art

In the modern networking environment, there is a strong need for grouping multiple devices and enabling the application services to communicate to every member of the group by establishing a single connection with the group rather than individual connections with each device within the group. The ability to refer to multiple devices as if they were a single device greatly simplifies development of applications and services that communicate with these devices. Additionally, the grouping of multiple devices, from either the same or different mobile network operators, into a single group entity enables a central neutral party to dynamically handle the creation, management, and deactivation of the device group.

Consider for example a current mobile data network architecture for direct Peer-to-Peer communications among mobile devices, which is much more difficult than the proposed method as described herein. Under the current mobile data network architecture, the traffic from the devices must traverse the mobile data network to reach the application server connected to the Internet or private cloud environment, and then be redirected back to the other device for Peer-to-Peer communications. Such implementations introduce additional workload from many different areas, including but not limited to, the mobile networks, the content delivery network, the application systems, and the firewalls. It also introduces complexity in the application development, as the applications on both the client and server sides have to deal with additional network address translator (NAT) traversal technologies and requires implementation of security and encryption controls which increases resource consumption. By handing off these complex and resource-intensive processes, individual application/service owners and providers can streamline their development and operations.

Accordingly, what is needed is system and method for improving mobile data network communications by virtually grouping multiple user devices and enabling application services to communicate to every user device in the virtual device group by establishing a single connection with the group, rather than individual connections with each user device within the group. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for a system and method for improving mobile data network communications by virtually grouping multiple user devices and enabling application services to communicate to every user device in the virtual device group by establishing a single connection with the group, rather than individual connections with each user device within the group is now met by a new, useful, and nonobvious invention.

This invention includes networking and application systems that intercept the data communications protocols-such as GTP-C, GTP-U, and Mobile IP. The invention includes grouping multiple mobile devices together into a virtual device group. The grouping can be achieved either dynamically or via static configuration. Once a virtual device group is established, the invention exposes to application servers an application programming interface (API) with a single identity for the virtual device group. By using a single API and single identity for a virtual group of devices, the invention simplifies the interfacing between the application servers and multiple user devices. The invention provides various data control functions between the application servers and the grouped user devices. Some examples of data control functions include the following: facilitation of the data exchange among the user devices within mobile data network without the need to traverse the Internet network; conversion of the data into different formats according to the policies defined for the group; multicasting the data to different destinations; and selectively blocking or allowing certain data exchanges between the user devices and network applications.

The invention works across multiple operators, which means that user devices from different carriers can be flexibly associated with one or multiple virtual groups. Virtual groups can be further chained to form new groups.

An embodiment of the invention includes a method of providing data services to a plurality of user devices. A plurality of network-connected user devices are grouped into a virtual device group and an IP address pool is assigned to the virtual device group. Each of the plurality of user devices is identified by an individual device identification. In an embodiment, the user device identification is its international mobile subscriber identification (IMSI), International Mobile Station Equipment Identity (IMEI), or mobile station international subscriber directory number (MSISDN).

The novel method further includes intercepting routing information exchanged between the home gateway residing in one mobile network and the serving gateway residing in the same or different mobile network, related with the first user device. In an embodiment, the home gateway is a gateway GPRS support node (GGSN), packet data network gateway (PGW), L2TP network server (LNS), or home agent (HA); and the serving gateway is a serving GPRS support node (SGSN), serving gateway (SGW), L2TP access concentrator (LAC), or foreign agent (FA).

The method also includes determining if the first user device is assigned to the virtual device group. Responsive to determining that the first user device is assigned to the virtual device group, the routing information is rewritten to replace an IP address assigned by the home gateway with the IP address of the virtual device group, wherein the IP address of the virtual group is an IP pool. Then the routing information is sent to the first user device with the assigned IP address having been replaced with the IP address of the virtual device group.

An embodiment in response to the first user device sending upstream data packets to an application server includes intercepting the upstream data packets; identifying the first user device responsible for the upstream data packets; inspecting the upstream data packets and verifying policies related with the first user device; and executing any corresponding allow, deny, encrypt and decrypt actions. In an embodiment, the method further includes queuing the upstream data packets, reformatting the upstream data packets, and converting the data packets to mediate the communications between the first user device and the application server. An embodiment further includes decapsulating a GTP-U header on the upstream data packets and forwarding the upstream data packets to the application server. In addition, an embodiment includes intercepting a downstream data packet sent from the application server to the first user device; verifying policies related with the first user device; executing any corresponding allow, deny, encrypt and decrypt actions; and relaying the downstream data packets to the first user device.

In response to the first user device attempting to send data packets to a second user device that has been assigned to the virtual group, an embodiment includes intercepting outgoing data packets upstream from a serving gateway; determining if the second user device is grouped in the virtual device group; in response to determining that the second user device is grouped in the virtual device group, routing the outgoing data packets back to the serving gateway, without traversing an internet backbone, to be relayed to the second user device. In an embodiment, the step of routing the outgoing data packets back to the serving gateway includes modifying GTP-U headers in the data packets with GTP-C session information for the second user device.

In response to the first user device requesting to pull messages from an application server, an embodiment further includes intercepting a request to pull new messages from application server, upstream from a serving gateway; decapsulating GTP-U packets from the request; querying a database for content, wherein the database stores messages delivered from the application server; retrieving the content and encapsulating the retrieved content into GTP-U packets; sending the GTP-U packets back to the serving gateway for delivery to the first user device.

In response to an application server requesting that a message be pushed to the virtual device group, an embodiment further includes storing the message in a database; identifying each user device in the virtual device group; generates data packets to be delivered to each user device in the virtual device group; encapsulated the data packets with a GTP-U payload based on each user device's GTP-C session information; sending the encapsulated data packets to the to the serving gateway for delivery to each user device.

In an embodiment, each user device has a physical or virtual SIM card. Moreover, each of the user devices is identified during the mobile data session setup procedure. Furthermore, each of the user devices is grouped dynamically according to its type, location, or serving network. In an embodiment, each of the user devices is grouped manually via a centrally managed configuration portal, or is peer discovered by the user devices.

In an embodiment, each of the user devices operates in accordance with a communications protocol selected from the group consisting of GTP-C, GTP-U, L2TP, and Mobile IP. In addition, at least some of the user devices subscribe to different mobile networks.

An embodiment includes assigning IP addresses to the user devices within the virtual group, wherein the assigned IP addresses are different than IP addresses issued to the user devices by mobile networks. In an embodiment, user devices within the virtual group can communicate with one another without traversing Internet.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term "user device (UD)" refers to user equipment and/or IoT devices. "User equipment" is a term of art and includes any device used directly by an end-user to communicate. "IoT devices" is also a term of art and include any devices, vehicles, home appliances and other items capable of connecting to a network and exchanging data.

As used herein, "upstream data packets" refer to data packets moving in a direction from a UD to an application server; and "downstream data packets" refer to data packets moving in a direction from an application server to a UD.

As used herein, "home gateway" refers to access gateways and/or nodes which provide access from a home network to an external network. A home gateway, includes, but is not limited to a gateway GPRS support node (GGSN), packet data network gateway (PGW), L2TP network server (LNS), and home agent (HA).

As used herein, "serving gateway" refers to serving gateways and/or nodes which manage packet switched data within the home network. A serving gateway, includes, but is not limited to a serving GPRS support node (SGSN), serving gateway (SGW), L2TP access concentrator (LAC), and foreign agent (FA).

Figure 1:
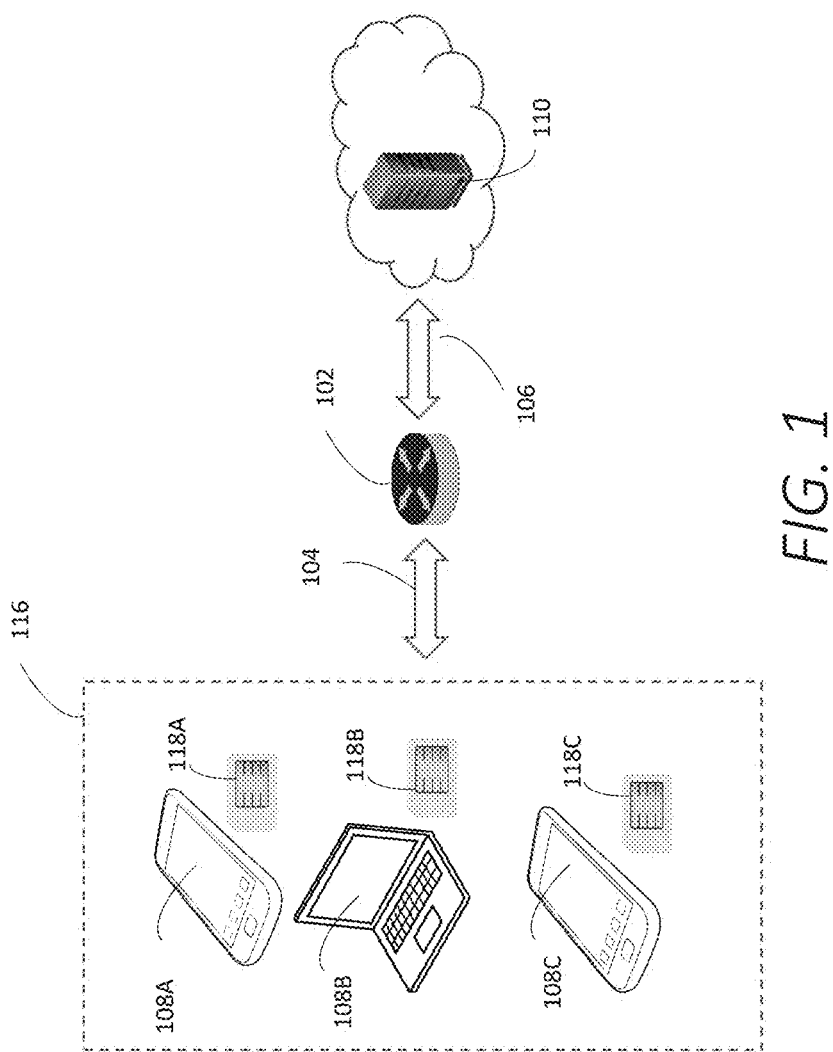
FIG. 1 is a block diagram schematically depicting the architecture of an embodiment of the present invention.
Figure 4:
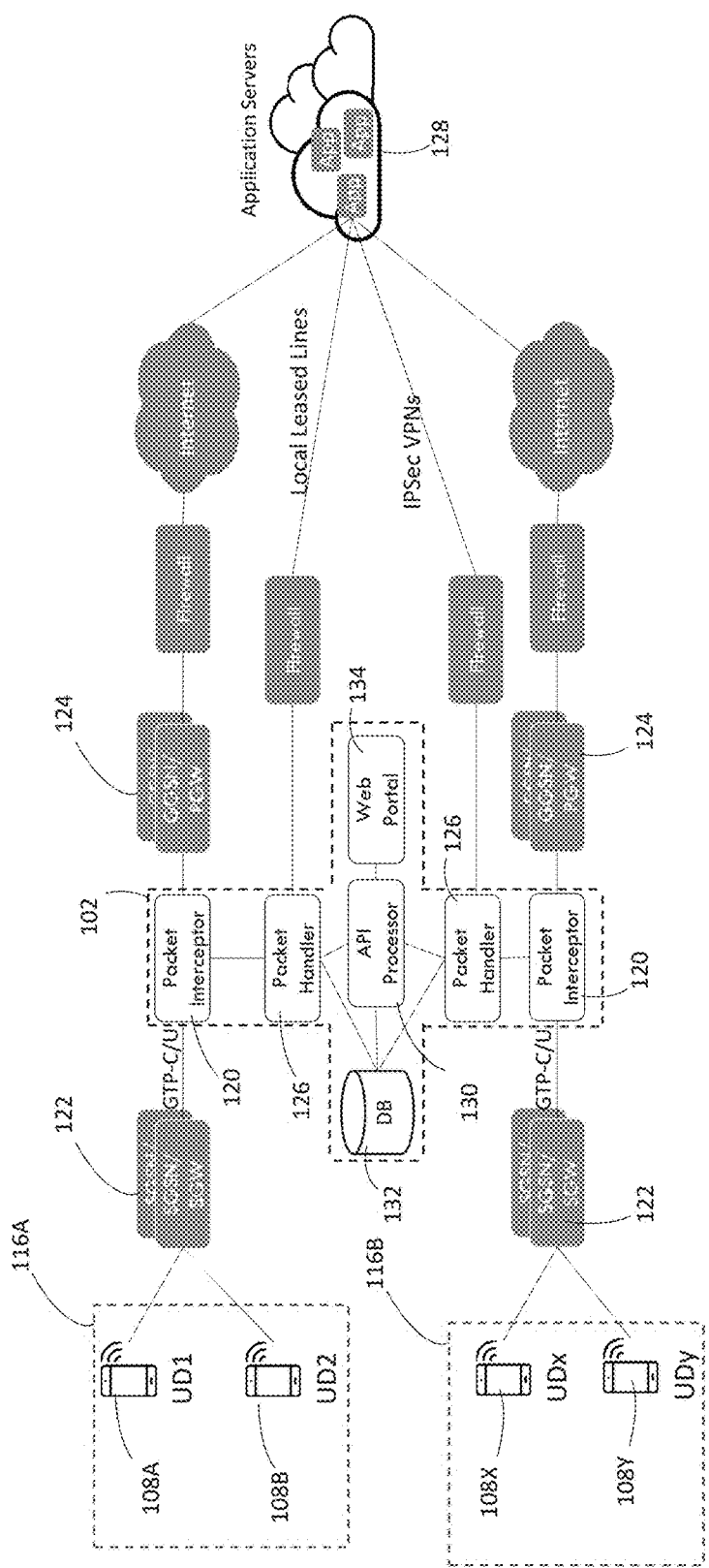
FIG. 4 is a block diagram schematically depicting one exemplified implementation of the system components in the GPRS/3G/LTE networks.

As shown in FIG. 1, an embodiment of the present invention includes a specialized networking and application system 102 that intercepts data communications 104, 106 between user devices (UDs) 108A-108C and original network equipment 110. The invention intercepts and controls the GTP-C and GTP-U data packets-IP-based communications protocols—in for example GPRS/3G/LTE networks, or the L2TP/MIP tunnels in the CDMA1x networks. In addition, the invention integrates into the existing network infrastructure, which is depicted in FIG. 4 and will be explained in greater detail below, without requiring any changes to the mobile carriers' systems. Effectively, the invention operates in a manner transparent to the existing mobile data network infrastructure, thereby allowing mobile carrier systems to operate as they would normally.

Figure 2:
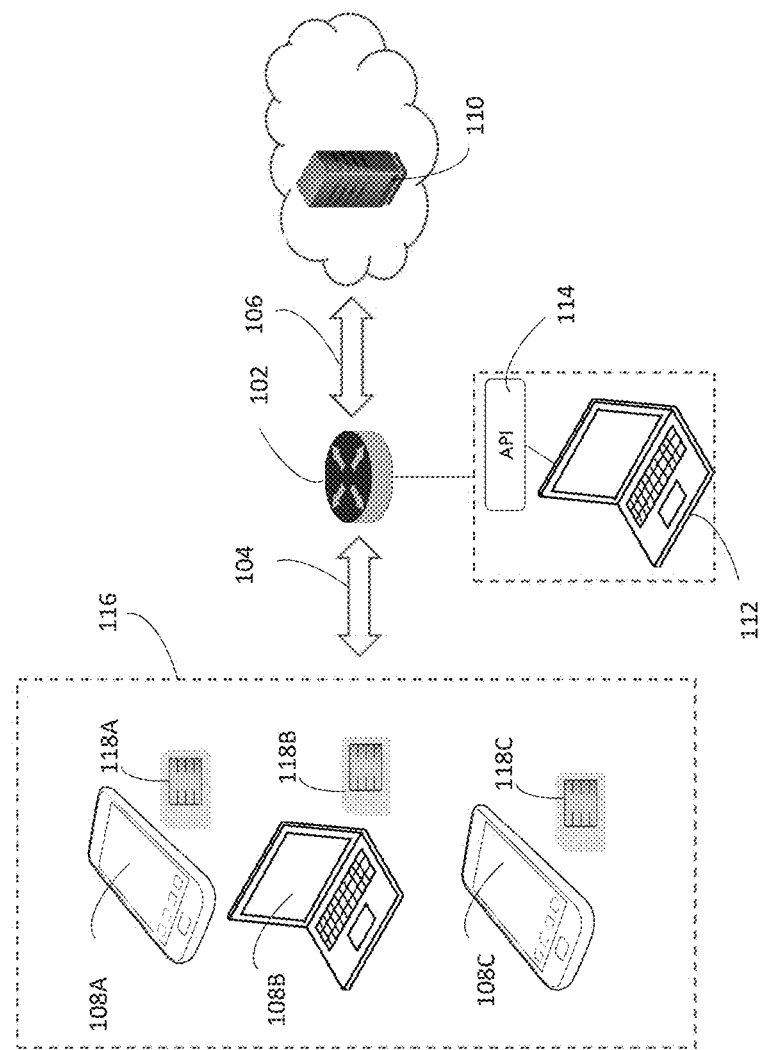
FIG. 2 is a block diagram schematically depicting the architecture of an embodiment of the present invention.

An embodiment, as depicted in FIG. 2, includes a graphic user interface (GUI), through for example computing device 112, and application programming interface (API) 114 which in combination enables system administrators to provide profiles based on UDs to organize said UDs into specific virtual device groups. As depicted in FIG. 2, UDs 108A-108C are allocated to a specific virtual device group 116. The system administrators can then configure different policies according to the UDs and group use cases. In an embodiment, the system automatically assigns UDs to specific virtual device groups based on predefined policies and the corresponding characteristics of the UDs or the associated users.

In an embodiment, each UD has either a virtual or physical SIM card 118A-118C, which are typically provided by a mobile carrier. SIM cards 118A-118C enable the invention to identify each UD by its international mobile subscriber identification (IMSI) and/or mobile station international subscriber directory number (MSISDN). The UDs can be further classified based on the device types (e.g., air conditioners, cars, mobile handsets, etc.) or their dynamic attributes (e.g., location area identity (LAI), mobile network code (MNC), GPS coordinates, etc.).

In mobile data networks, such as those using GPRS/3G/4G/LTE technologies, the invention enables management of the data sessions by supporting GTP protocol. The invention correlates the data session with the IMSI/MSISDN of the UDs within the virtual device group, intercepts data packets, and modifies the APN and IP addresses for the UDs according to the settings of the virtual device group. One important aspect of the invention is that the streaming backend of the application server is not aware that it is streaming to multiple UDs because, from the perspective of the application server, only a single outgoing data stream is being transmitted.

Figure 3:
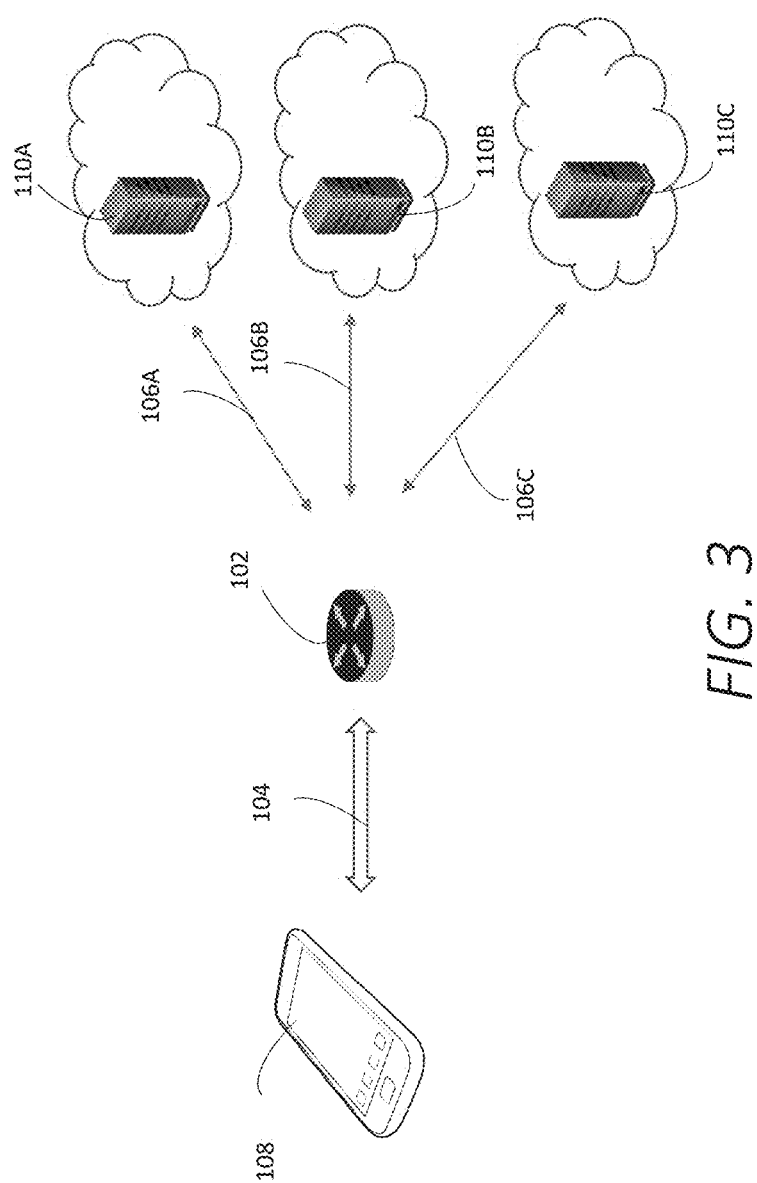
FIG. 3 is a block diagram schematically depicting a feature of the present invention.

In the embodiment depicted in FIG. 3, system 102 functions as a user payload proxy/service system. It intercepts the GTP-U payload and manipulates the traffic between the UD and the network server, or among multiple UDs and multiple network servers. On one side, payload proxy system 102 receives traffic 104 from UD 108. On the other side, payload proxy system 102 directs traffic 106A-106C to multiple destinations, such as another UD or multiple network servers 110A-110C. The directed traffic has its own connection and data transmission pool. In an embodiment, the invention receives traffic from one UD without encryption. The invention encrypts the traffic and sends it over to the network servers. When the invention receives the encrypted data back from the network servers, the invention decrypts the data and transmits the decrypted data to the UD.

In an embodiment, the invention provides device discovery function and network topology managing functions. These functions enable the invention to reassign the IP addresses of the UDs, rather than using the IP addresses issued by the original network components, such as GGSN, PGW. Thus, multiple UDs belonging to the same virtual device group can be assigned with IP addresses in the same VLAN. This feature simplifies the data exchange between the UDs within the VLAN because the UDs belonging to the same virtual group can communicate with each other directly without the need for traversing the Internet backbone via the application servers hosted in the Internet. Furthermore, the UDs belonging to the same virtual group can communicate with each other using IMSI, MSISDN or other IDs. The invention converts these IDs into corresponding IP addresses and manages those IP addresses.

Referring now to the system architecture as depicted in FIG. 4, networking and application system 102 can be seamlessly inserted into a traditional network architecture.

The components shown in grey scale with solid borders correspond to the traditional network architecture, while the components of an embodiment of present invention 102 are encapsulated in a dashed-line border. As depicted, packet interceptors 120 are installed in the network link between the SGSN/SGW 122 and GGSN/PGW 124. Packet interceptors 120 intercept and process the packets exchanged between the SGSN/SGW 122 and GGSN/PGW 124 without requiring any changes to the existing network elements. Packet interceptors 120 handle both the GTP-C and GTP-U packet, keep the session correlation information, and identify UDs 108A, 108B, 108X-108Y based on the IMSI and/or MSISDN information that is carried during the standard GTP-C session setup procedure. Accordingly, packet interceptors 120 collect identifying information for the UDs in the virtual device group and modify the GTP-C packets when corresponding GTP-C sessions are detected. In addition, the IP addresses of the UDs as assigned by the GGSN/PGW 124 are changed to new IP addresses associated with the corresponding virtual device group 116A, 116B.

Packet Interceptors 120 forward GTP-U packets related to UDs 108 to packet handlers 126. Packet handlers 126 inspect the GTP-U packets, verify the policies related with each device, and execute corresponding actions, e.g. allow, deny, encrypt, decrypt the packets based on the packet destinations. Packet handlers 126 can even queue the packets, reformat the packets, convert them into different formats, and mediate the communications between the UDs 108 and application servers. Packet handlers 126 further decapsulate the GTP-U header and forward the packets to the application servers.

Packet interceptors 120 also intercept data packets received from application servers 128. Packet handlers 126 encapsulate these packets with corresponding GTP-U headers associated with the UD's GTP-C session information, relay the encapsulated packets to mobile networks handled by SGSN/SGW 122, and then deliver to the packets to the UDs.

As depicted in FIG. 4, the data connection between packet handler 126 and the application in the application servers cloud 128 can be through either local leased lines or IPSec VPN, which allows the UDs and application servers to communicate with each other via their own IP address schemas and removes the need for NAT (Network Address Translation) and corresponding NAT traversal techniques. If the data connection is through an Internet connection, there is a common need to implement NAT function and special NAT traversal mechanism sitting between the GGSN/PGW and application servers as depicted in FIG. 4. These implementations are needed to facilitate the communication between UDs and application servers.

In an embodiment, the system architecture as depicted in FIG. 4 includes API Processor 130 that expose APIs for application servers or other management systems to interact with the system, e.g. adding or removing a UD from the virtual device group, sending push notifications to the virtual group of UDs, querying the active status of the UDs, etc. The exemplified embodiment further includes database 132 to store event information, UD information, and virtual device group information, wherein database 132 is accessible using the API processor 130. The depicted embodiment further includes web portal 134 as an administration function for GUI based operation.

In an embodiment, there are multiple links for the same mobile network operator, or across different mobile network operators. As depicted in the FIG. 4, packet interceptors 120 and packet handlers 126 are deployed/distributed in multiple links/locations. To synchronize the session information for a virtual device group, such as virtual device groups 116A, 116B, packet interceptors 120 and packet handlers 126 can communicate either directly with each other or through the database(s) 132 and/or API processor(s) 130. Thus, virtual device groups 116A, 116B can be attached and connected from different mobile networks, either domestically or in roaming.

Figure 5:
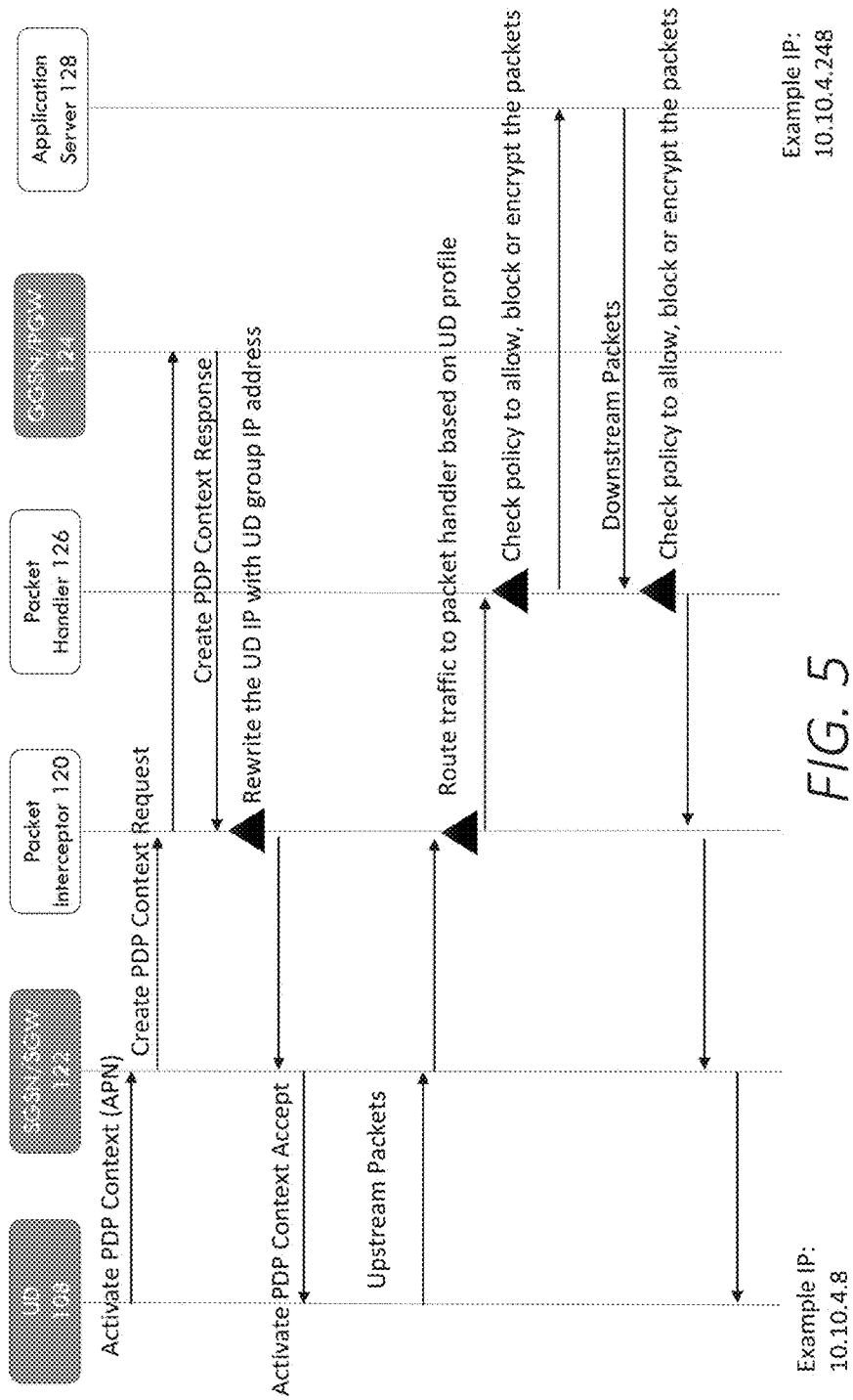
FIG. 5 is a sequential diagram schematically depicting one exemplified message flow for the communications between the user devices and the application server.

Referring now to the exemplary sequential diagram depicted in FIG. 5, an exemplary communication between UD 108 and application server 128 begins with UD 108 attaching to SGSN/SGW 122 in the mobile network through the standard GPRS activate PDP context process. SGSN/SGW 122 then sends out the create PDP context request to GGSN/PGW 124, which is intercepted, undenounced to either SGSN/SGW 122 or GGSN/PGW 124, by packet interceptor 120. Packet interceptor 120 identifies the UD associated with the request. The create PDP context request is then relayed to GGSN/PGW 124, and upon processing the request message, GGSN/PGW 124 responds with the create PDP context response, which is also intercepted by packet interceptor 120. Packet interceptor 120 correlates the response with the request message, identifies the UD's identifier (e.g. IMSI, MSISDN, IMEI, etc.), associates the UD's identifier with a specific virtual device group 116 stored in database 132, and modifies the response message if the particular UD 108 is associated with a particular virtual device group 116. The modification of the response message includes rewriting of the UD's IP address to the IP address from the corresponding virtual device group's IP address pool, changing the QoS, and/or charging characteristic value based on the configurations. For this example, the IP address of UD 108 is changed to 10.10.4.8, which is in the same subnet as application server 128, which has an IP address of 10.10.4.248, allowing direct communication between the virtual device group and the application server. SGSN/SGW 122 receives the modified create PDP context and then responds back to UD 108 with the activated PDP context accept handled by the mobile networks' radio access network components, such as eNodeB, base stations, etc. As a result, UD 108 is attached to the mobile network and can setup the data communications with application servers 128 and other UDs 108.

As further depicted in FIG. 5, UD 108 sends out upstream packets to application server 128, which are routed to SGSN/SGW 122 and are intercepted by packet interceptor 120. Packet interceptor 120 identifies the UD responsible for the upstream packet and routes the upstream packets to packet handler 126 based on the UD's profile. Packet handler 126 inspects the upstream packets, verifies the policies related with the UD, and executes corresponding actions, e.g. allow, deny, encrypt, decrypt the packets based on the packet destinations. Packet handler 126 can also queue the packets, reformat the packets, and convert them into different formats to mediate the communications between UDs 108 and application servers 128. Packet handler 126 further decapsulates the GTP-U header and forwards the packets to application servers 128.

Upon receiving the upstream packets from packet handler 126, application server 128 processes and returns downstream packets. The downstream packets are intercepted and relayed by packet handler 126. Packet handler 126 verifies the policies related with UD 108, and executes corresponding actions again for those downstream packets, e.g. allow, deny, encrypt, and decrypt the packets. Packet handler 126 can also queue the packets, reformat the packets, and convert them into different formats to mediate the communications between UDs 108 and application servers 128. After verifying the policies and executing any necessary actions, packet handler 126 encapsulates the processed packets with a corresponding GTP-U header associated with the UD's GTP-C session information, relays the encapsulated packets to the correct mobile network(s) through SGSN/SGW 124 and Radio Access Network components. The downstream packets are delivered to UD 108, and then further processed by the client software running on UD. It should be noted that packet handler 126 keeps track of the IP information of the UD. Since this flow is between one UD and an application server, and packet handler 126 keeps track of the IP information of the UD, when the application server returns the downstream packet, packet handler 126 uses the destination IP of the downstream packet to derive the recipient UD and add back the GTP-U payload data.

Figure 6:
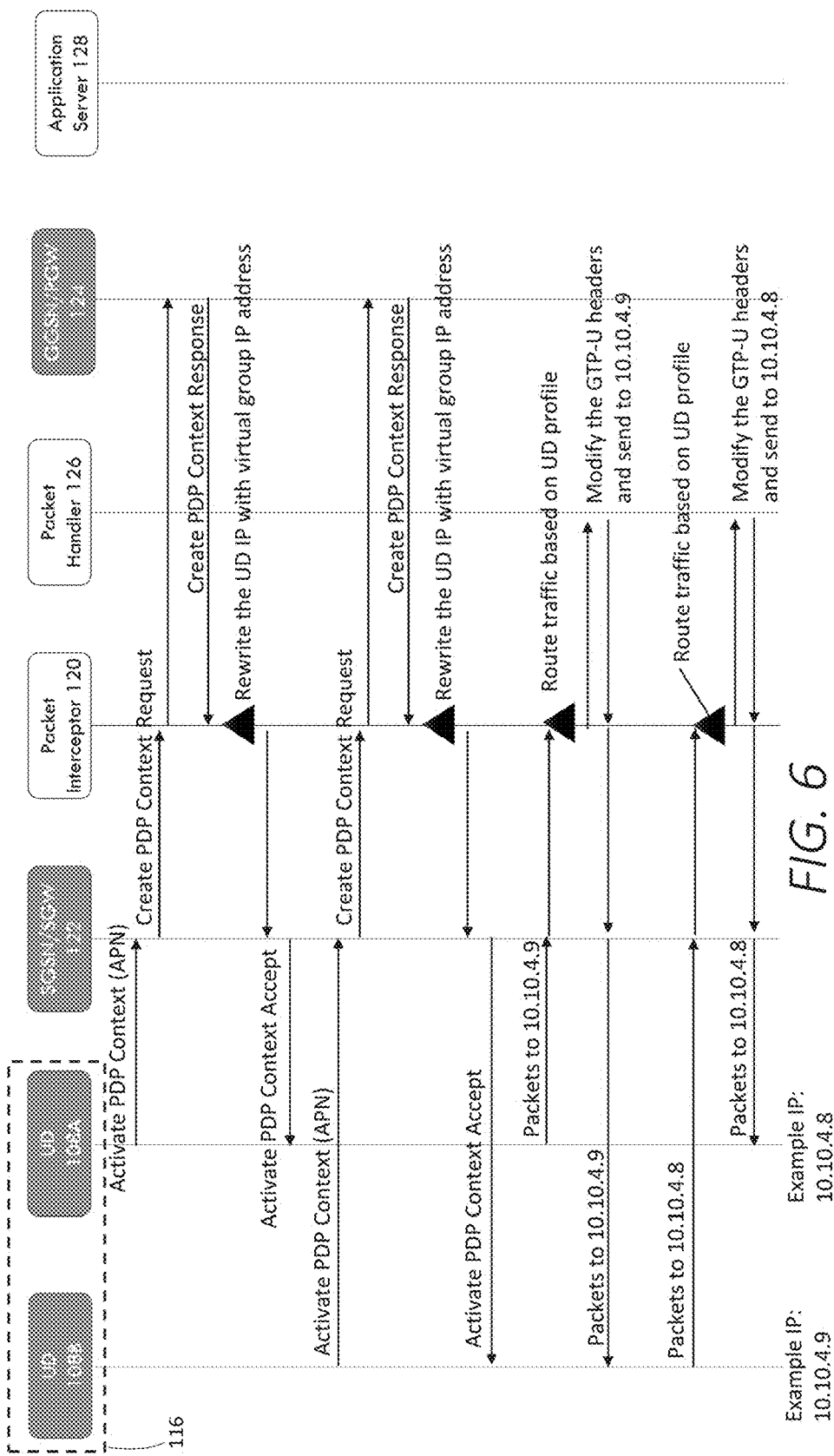
FIG. 6 is a sequential diagram schematically depicting one exemplified message flow for peer-to-peer communications between two user devices.

Referring now to FIG. 6, an exemplary sequential diagram depicts how the present invention modifies the message flow of direct communication between two UDs 108A, 108B that belong to the same virtual device group 116. UDs 108A, 108B successfully attach to the mobile network by following the same processes as depicted in FIG. 5 and are assigned with the exemplary IP addresses 10.10.4.8 and 10.10.4.9 respectively. It should be noted that the IP address of the virtual device group is a pool, not just a single IP address. So, the UDs in the virtual group are assigned different IP addresses in the same subnet.

When the application running on UD 108A needs to establish the connection with the application running on UD 108B, UD 108A sends out packets with a destination of 10.10.4.9—the IP address for UD 108B as assigned by packet interceptor 120. The packets are received by SGSN/SGW 122, and then intercepted by the packet interceptor 120. Since the packets are coming from a UD in the same virtual device group 116, packet interceptor 120 routes the packets to packet handler 126. Packet handler 126 can then perform the necessary actions based on defined policies for the virtual device group. Because the packets are destined to UD 108B, which is connected to the data network and in the same virtual device group 116 as sending UD 108A, packet handler 126 modifies the GTP-U headers with UD 108B's GTP-C session information and routes it back to packet interceptor 120. From there, the packets are sent to SGSN/SGW 122 for further processing and the packets are routed to the application running on UD 108B.

Similarly, packets sent from UD 108B to UD 108A undergo a similar process. The packets are processed and modified by packet handler 126 and then routed to UD 108A following a similar path. UD 108A and UD 108B are not necessarily attached to the same mobile network nor are they necessarily processed by the same SGSN/SGW 122 and/or GGSN/PGW 124. An embodiment of the present invention can further implement synchronization and data transfer channels between multiple packet interceptors and/or packet handlers, thus the peer-to-peer communication among multiple UDs can be facilitated and setup through the multiple packet interceptors and/or packet handlers located in same or different locations.

In an embodiment, the invention functions as a broadcasting server or as message delivery server, thereby eliminating the need for a dedicated server to specifically manage the delivery to multiple destinations. The invention provides a simplified API to allow the server to initialize the broadcasting. The invention also functions as the broadcasting endpoint. Therefore, on one side, the invention receives the content from the server, and then, on the other side, it broadcasts the same content to multiple UDs according to the settings of the virtual device group.

Figure 7:
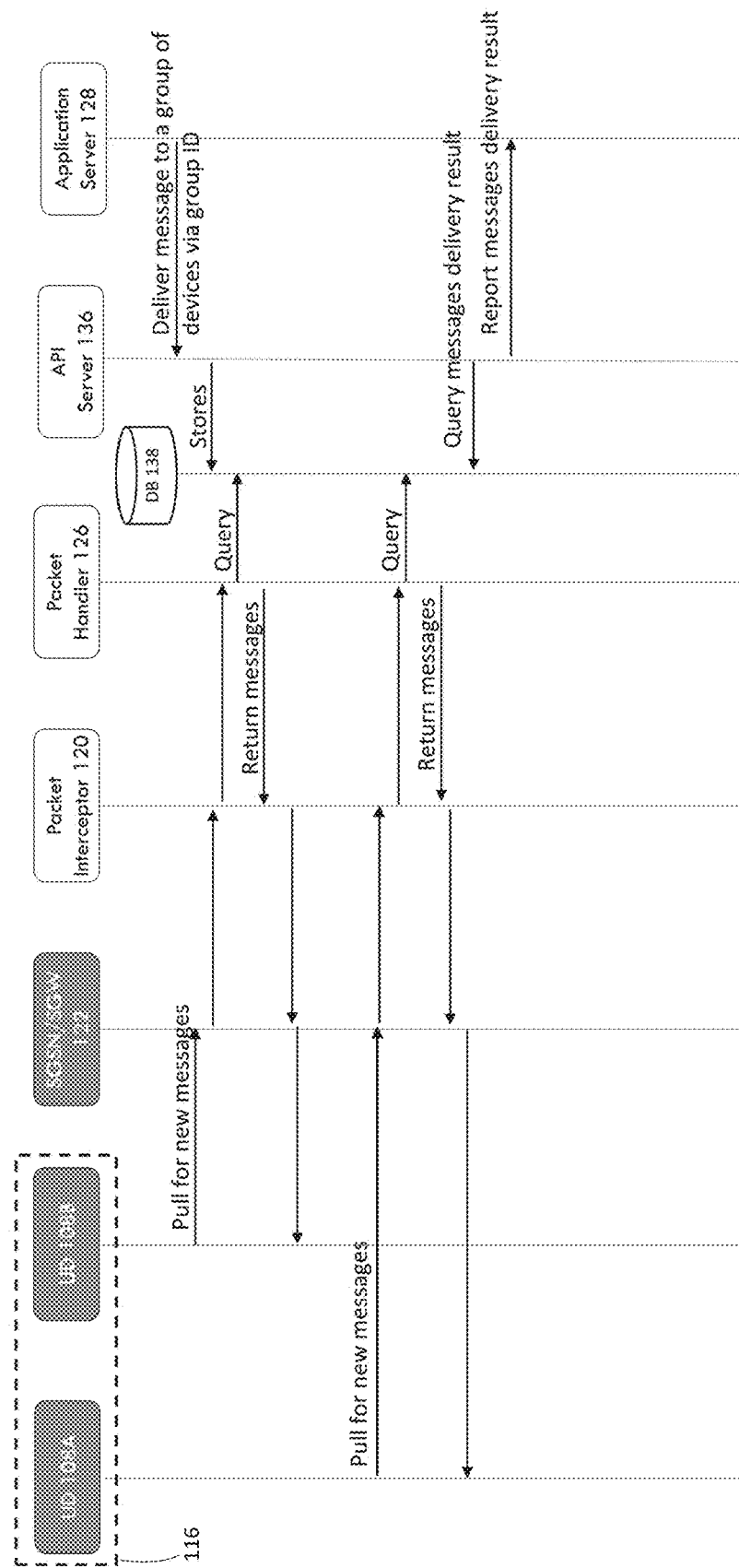
FIG. 7 is a sequential diagram schematically depicting one exemplified message flow for a group of user devices to pull the messages from an application server via a group ID.

Referring now to FIG. 7, an exemplary sequential diagram depicts how an embodiment of the present invention manages the message flow for virtual device group 116 of UDs 108A, 108B when the communication is a request to pull messages from application server 128. Application server 128 interfaces with API server 136 to deliver messages to virtual device group 116 of UDs 108A, 108B, identified by a virtual device group ID. API server 136 stores the messages in database 138 for later query and retrieval. UDs 108A, 108B periodically trigger and send "pull for new messages" requests to the network, which are intercepted by packet interceptor 120 and routed to packet handler 126. Upon receiving the pull requests, packet handler 126 decapsulates the GTP-U packets, triggers the query into database 138, encapsulates the retrieved content into GTP-U packets, and sends the packets back to SGSN/SGW 122, which are then received by the applications running on UDs that sent the "pull for new messages" requests. Packet handler 126 further updates the message delivery status in database 138. As a result, API server 136 can query the message delivery result, and notify application server 128 via report messages delivery result.

It should be noted that the message flow is simplified for illustrative purpose. A person skilled in the art or science can incorporate complex event subscribe and notify mechanisms to fulfill the need for message delivery, however, the additional complexities do not impact the invention's ability to assign UDs to a virtual device group and implement a system to ease and simplify the communication from an application server to a virtual group of devices.

Figure 8:
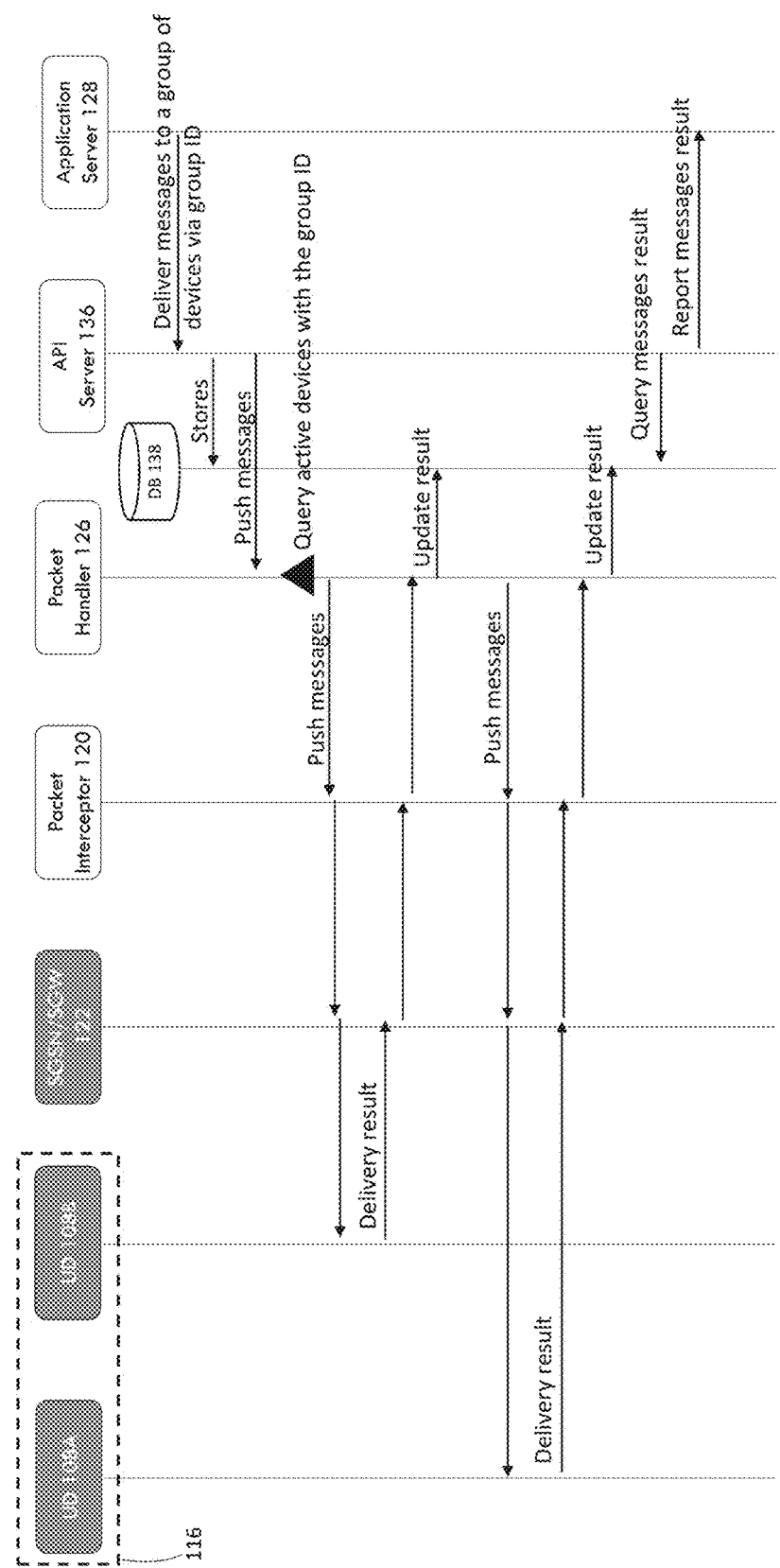
FIG. 8 is a sequential diagram schematically depicting one exemplified message flow for the application server to push messages to the group of user devices via the group ID.

FIG. 8 the exemplary schematic depicts how an embodiment of the present invention handles push messages from application server 128. The exemplified message flow depicts how push messages are delivered to virtual device group 116 via a group ID. Application server 128 interfaces with API server 136 to deliver messages to UDs 108A, 108B in virtual device group 116 as identified by a virtual device group ID. API server 136 stores the messages in database 138 and notifies packet handler 126 of the new messages. Packet handler 126 retrieves the active UDs associated with the virtual device group ID, from either its internal memory or central databases, and then generates packets to be delivered to each UD 108A, 108B associated with the virtual device group ID. The packets are further encapsulated with the GTP-U payload based on each device's GTP-C session information, and then sent to the packet interceptor 120, which are further sent to the SGSN/SGW 122 and are then received by the applications running on UDs 108A, 108B. The applications running on UDs 108A, 108B can then generate response packets to acknowledge the message delivery result. The response packets are sent to SGSN/SGW 122, then to the packet interceptor 120, and then to the packet handler 126. Packet handler 126 decapsulates the GTP-U payload off the packet, identifies the packet message type, and then updates the message delivery status in database 138. API server 136 can then query the message delivery results and notify application server 128 via report messages delivery result.

Again, the message flow is simplified for illustrative purposes. A person skilled in the art would understand that complex event subscribe and notify mechanisms are needed to fulfill the need for message delivery but said mechanisms do not affect the inventive ability to assign user devices to a virtual device group and implement a system for easily and efficiently delivering push messages to a virtual group of devices.

The invention provides the capability to create ad-hoc interest groups, and thus any user devices can opt-in to receive specific topics on demand. Examples of business services enabled by the invention include streaming instructional videos to a group of persons, such as passengers on a flight, students at a class lecture, or to attendees at a concert or a sporting game in a stadium. The invention may further facilitate parental control by replicating a data stream being sent to a child's mobile device and sending the stream to a parent's device.

The above exemplary embodiments of the invention use GSM/GPRS/LTE mobile data network as exemplified network environments, in which SGSN/SGW and GGSN/PGW are the core components deployed and operated by mobile network operators, while GTP protocol including the GTP-C for session control signaling and GTP-U for user payload are the protocol to be implemented and supported from the packet interceptor and packet handler. An embodiment of the present invention can be implemented with similar components and methodologies over other networks technologies, such as for CDMA or Wi-Fi networks where L2TP or mobile IP protocol are implemented, the packet interceptor and packet handler can be implemented to support L2TP and/or mobile IP protocol, and deployed between the L2TP endpoints, namely LAC (L2TP access concentrator) and the LNS (L2TP network server) respectively, or between the mobile IP endpoints, namely the HA (home agent) and FA (foreign agent).

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of providing data services to a plurality of user devices, the method comprising:
grouping a plurality of network-connected user devices into a virtual device group, wherein each of the plurality of user devices is identified by an individual device identification;
assigning an Internet Protocol (IP) address to the virtual device group, wherein the IP address of the virtual group is an IP address pool;
intercepting routing information, related to a first user device, exchanged between a home gateway residing in one mobile network and a serving gateway residing in the same or different mobile network;
determining if the first user device is assigned to the virtual device group;
responsive to determining that the first user device is assigned to the virtual device group, rewriting the routing information to replace an IP address assigned by the network gateway with the IP address of the virtual device group; and
sending the routing information to the first user device with the assigned IP address having been replaced with the IP address of the virtual device group.

2. The method of claim 1, in response to the first user device sending upstream data packets to an application server, further includes:
intercepting the upstream data packets;
identifying the first user device responsible for the upstream data packets;
inspecting the upstream data packets and verifying policies related with the first user device; and
executing any corresponding allow, deny, encrypt and decrypt actions.

3. The method of claim 2, further including queuing the upstream data packets, reformatting the upstream data packets, and converting the data packets to mediate the communications between the first user device and the application server.

4. The method of claim 2, further including decapsulating a GTP-U header on the upstream data packets and forwarding the upstream data packets to the application server.

5. The method of claim 2, further including:
intercepting a downstream data packet sent from the application server to the first user device;
verifying policies related with the first user device;
executing any corresponding allow, deny, encrypt and decrypt actions; and
relaying the downstream data packets to the first user device.

6. The method of claim 1, in response to the first user device attempting to send data packets to a second user device that has been assigned to the virtual group, further includes:
intercepting outgoing data packets upstream from a serving gateway;
determining if the second user device is grouped in the virtual device group;
in response to determining that the second user device is grouped in the virtual device group, routing the outgoing data packets back to the serving gateway, without traversing an internet backbone, to be relayed to the second user device.

7. The method of claim 6, wherein the step of routing the outgoing data packets back to the serving gateway includes modifying GTP-U headers in the data packets with GTP-C session information for the second user device.

8. The method of claim 1, in response to the first user device requesting to pull messages from an application server, further includes:
intercepting a request to pull new messages from application server, upstream from a serving gateway;
decapsulating GTP-U packets from the request;
querying a database for content, wherein the database stores messages delivered from the application server;
retrieving the content and encapsulating the retrieved content into GTP-U packets;
sending the GTP-U packets back to the serving gateway for delivery to the first user device.

9. The method of claim 1, in response to an application server requesting that a message be pushed to the virtual device group, further includes:
storing the message in a database;
identifying each user device in the virtual device group;
generates data packets to be delivered to each user device in the virtual device group;
encapsulated the data packets with a GTP-U payload based on each user device's GTP-C session information;
sending the encapsulated data packets to the serving gateway for delivery to each user device.

10. The method of claim 1, wherein the user device identification is its international mobile subscriber identification (IMSI), International Mobile Station Equipment Identity (IMEI), or mobile station international subscriber directory number (MSISDN).

11. The method of claim 1, wherein each user device has a physical or virtual SIM card.

12. The method of claim 1, wherein at least some of the user devices subscribe to different mobile networks.

13. The method of claim 1, wherein each of the user devices operates in accordance with a communications protocol selected from the group consisting of GTP-C, GTP-U, L2TP, and Mobile IP.

14. The method of claim 1, wherein each of the user devices is identified during the mobile data session setup procedure.

15. The method of claim 1, wherein each of the user devices is grouped dynamically according to its type, location, or serving network.

16. The method of claim 1, wherein the home gateway is a gateway GPRS support node (GGSN), packet data network gateway (PGW), L2TP network server (LNS), or home agent (HA).

17. The method of claim 1, wherein the serving gateway is a serving GPRS support node (SGSN), serving gateway (SGW), L2TP access concentrator (LAC), or foreign agent (FA).

18. The method of claim 1, further comprising the step of assigning IP addresses to the user devices within the virtual group, wherein the assigned IP addresses are different than IP addresses issued to the user devices by mobile networks.

19. The method of claim 1, wherein the user devices within the virtual group can communicate with one another without traversing Internet.

20. The method of claim 1, further comprising the steps of encrypting and decrypting intercepted data packets.

* * * * *